UNITED STATES PATENT OFFICE.

JAMES WALLIS, OF BEDDINGTON, ENGLAND, ASSIGNOR OF ONE-HALF TO J. & T. H. WALLIS, LIMITED, OF BEDDINGTON, ENGLAND.

TREATMENT OF GERM OF WHEAT.

1,021,119.  Specification of Letters Patent.  Patented Mar. 26, 1912.

No Drawing.  Application filed May 15, 1911.  Serial No. 627,305.

*To all whom it may concern:*

Be it known that I, JAMES WALLIS, a subject of the King of England, residing at Beddington, Surrey, in England, have invented certain new and useful Improvements in the Treatment of Germ of Wheat and in Obtaining a Preparation Therefrom for Incorporation with Flour and Meal, of which the following is a specification.

This invention relates to improvements in the treatment of germ of wheat and in obtaining a preparation therefrom for incorporation with flour and meal for making bread, biscuits, and the like, and the object of my invention is to utilize to the full the valuable properties of the germ of wheat which when suitably treated and added to or incorporated with flour and meal will enable me to produce therefrom whole-meal bread of excellent flavor and properties prepared from the pure product of the wheat only.

My invention consists in thoroughly roasting or cooking the germ of wheat and grinding or suitably treating same to form a medium meal and mixing or incorporating the material thus obtained with flour and wheaten meal.

In carrying out my process I take a suitable quantity of pure wheaten germ and place it on plates, trays, or the like and cook or roast it, in preferably a draw-plate oven, at a temperature of about 460° F., after which it is allowed to cool and is finally ground into a medium meal by passing same through corrugated rolls or in any other suitable way. I then mix in a dry state the meal thus obtained with a certain quantity of strong patent flour which is known in the trade as "patents" and is the name given to the best and strongest flour, and a certain quantity of stone-made wheaten meal preferably composed of approximately one-third No. 1 Manitoba wheat and two-thirds of best red English wheat.

As examples of the proportions I obtain excellent results by using approximately to 200 lbs. of pure English germ treated as described, 560 lbs. of strong wheaten flour and 560 lbs. of stone-made wheaten meal composed of the mixtures of wheat as previously stated.

In mixing the above materials I preferably use three automatic mixers that is to say mixers set to gage and delivering the required quantities of the said materials. These mixers are fed from bins and driven by a main shaft at the speed required and after the materials have been well mixed I pass the same through a centrifugal machine to thoroughly incorporate the separate matters.

It is obvious that any other mixing-apparatus or means may be employed, the desideratum being a thorough mixing of the materials preparatory to undergoing the ordinary operations of bread making and the like purposes.

What I claim as my invention and desire to secure by Letters Patent of the United States is:—

1. The process for the treatment of germ of wheat, consisting in roasting the germ of wheat at a temperature of about 460° Fahrenheit, allowing same to cool, and then finally grinding the roasted germ into a medium meal.

2. The dry process for the treatment of germ of wheat, consisting in roasting the germ of wheat at a high temperature, allowing same to cool and then grinding the roasted germ into a medium meal, and finally mixing a proportion of the material thus obtained with flour and wheat-meal.

3. A preparation for use with flour and wheat-meal, comprising germ of wheat roasted at a temperature of about 460° Fahrenheit and formed into a medium meal.

4. A preparation for bread-making, comprising germ of wheat roasted at a temperature of about 460° Fahrenheit, ground to a medium meal and mixed with flour and wheat-meal, the flour and wheat-meal being in excess of the germ of wheat.

5. A food product, comprising mixed raw ground wheat and ground wheat-germs roasted at a temperature of about 460° Fahrenheit.

In witness whereof I have signed this specification in the presence of two witnesses.

JAMES WALLIS.

Witnesses:
  C. P. LIDDON,
  RIPLEY WILSON.